(12) United States Patent
Mosier et al.

(10) Patent No.: US 12,181,603 B2
(45) Date of Patent: Dec. 31, 2024

(54) METHOD AND APPARATUS FOR HIGH-CONFIDENCE PEOPLE CLASSIFICATION, CHANGE DETECTION, AND NUISANCE ALARM REJECTION BASED ON SHAPE CLASSIFIER USING 3D POINT CLOUD DATA

(71) Applicant: The Johns Hopkins University, Baltimore, MD (US)

(72) Inventors: Bruce P. Mosier, Baltimore, MD (US); Lee S. Stearns, Laurel, MD (US); Daniel D. Winker, Columbia, MD (US); Nicolas Norena Acosta, Silver Spring, MD (US)

(73) Assignee: The Johns Hopkins University, Baltimore, MD (US)

( * ) Notice: Subject to any disclaimer, the term of this patent is extended or adjusted under 35 U.S.C. 154(b) by 958 days.

(21) Appl. No.: 17/206,577

(22) Filed: Mar. 19, 2021

(65) Prior Publication Data

US 2022/0035003 A1    Feb. 3, 2022

Related U.S. Application Data

(60) Provisional application No. 63/058,147, filed on Jul. 29, 2020.

(51) Int. Cl.
*G01S 7/48* (2006.01)
*G01S 17/42* (2006.01)
(Continued)

(52) U.S. Cl.
CPC ............ *G01S 7/4802* (2013.01); *G01S 17/42* (2013.01); *G01S 17/89* (2013.01); *G08B 13/181* (2013.01); *G08B 29/185* (2013.01)

(58) Field of Classification Search
None
See application file for complete search history.

(56) References Cited

U.S. PATENT DOCUMENTS

2006/0050929 A1\* 3/2006 Rast .................. F42B 5/035
382/103
2016/0275686 A1\* 9/2016 Zach .................. G06V 20/64
(Continued)

OTHER PUBLICATIONS

Galil et al., Data Structures and Algorithms for Disjoint Set Union Problems, ACM Computing Surveys, Sep. 1991, pp. 319-344, vol. 23, No. 3.

(Continued)

*Primary Examiner* — Hovhannes Baghdasaryan
(74) *Attorney, Agent, or Firm* — Todd Farnsworth (57) ABSTRACT

A detector may include processing circuitry configured to receive monitoring data associated with an environment being monitored, where the monitoring data includes a series of frames of three-dimensional point cloud information. The processing circuitry may be further configured to perform image segmentation on the monitoring data to generate segmented three-dimensional data associated with the environment, identify one or more objects in the environment based on subtracting background from the segmented three-dimensional data, convert data associated with the one or more objects from the segmented three-dimensional data into two-dimensional object data, and perform object classification on the two-dimensional object data.

20 Claims, 8 Drawing Sheets

(51) Int. Cl.
*G01S 17/89* (2020.01)
*G08B 13/181* (2006.01)
*G08B 29/18* (2006.01)

(56) References Cited

U.S. PATENT DOCUMENTS

2019/0145765 A1* 5/2019 Luo .................... G06V 10/764
                                                                702/153
2019/0251401 A1* 8/2019 Shechtman ............ G06V 10/82
2020/0151512 A1* 5/2020 Corral-Soto .......... G06F 18/217

OTHER PUBLICATIONS

Galler et al., An Improved Equivalence Algorithm, Communications of the ACM, May 1964, pp. 301-302, vol. 7, No. 5.
Sandler et al., MobileNetV2: Inverted Residuals and Linear Bottlenecks, 2018 IEEE/CVF Conference on Computer Vision and Pattern Recognition, 2018, pp. 4510-4520.

* cited by examiner

METHOD AND APPARATUS FOR HIGH-CONFIDENCE PEOPLE CLASSIFICATION, CHANGE DETECTION, AND NUISANCE ALARM REJECTION BASED ON SHAPE CLASSIFIER USING 3D POINT CLOUD DATA

CROSS-REFERENCE TO RELATED APPLICATIONS

This application claims the benefit of U.S. Provisional Application No. 63/058,147 filed on Jul. 29, 2020, the entire contents of which are hereby incorporated herein by reference.

STATEMENT OF GOVERNMENTAL INTEREST

This invention was made with Government support under contract number 70B02C19C00000093 awarded by DHS—Customs & Border Protection. The Government has certain rights in the invention.

TECHNICAL FIELD

Example embodiments generally relate to techniques for detecting specific objects (e.g., people) by shape classification and, in particular, relate to an apparatus and method for employing LIDAR for shape classification and detection, which also provides the ability to avoid nuisance alarms.

BACKGROUND

The use of motion detectors for monitoring human or animal activity in a particular environment is common, and such sensors are relatively inexpensive. However, to the extent alarms or alerts are given in the event of detecting motion, such detectors may generate nuisance alarms quite frequently. Thus, it is often desirable to employ a detector that can classify the objects that are detected in its environment.

Most sensors or detectors that are able to perform classifications on the objects that appear in an environment that is being monitored employ thermal cameras or cameras that operate in the visible light spectrum. Such detectors may perform well enough for certain environments, but nevertheless struggle with excessive nuisance alarms (or alternatively with too little sensitivity to objects of interest). In particular, such detectors all generate nuisance alarms of their own, with edge-based models having higher nuisance alarm rates than more complex/larger models requiring communications and power to send images. Visible and thermal cameras do not, in general, determine scale, particularly in natural environments or industrial environments with few known entities to compare, which leads to objects in the environment being mis-classified, for example, trees, sign posts, and small animals as people. For stationary sensors, nuisance alarms on background objects will frequently occur and appear to confirm a motion sensor nuisance alarm, resulting in minimal benefit to use of the visible/thermal camera classifier. The visible camera and thermal camera classifiers also do not, in general, perform motion detection (for various technical reasons) to exclude stationary objects (i.e., no velocity filtering). Such cameras are also significantly affected by weather and ambient lighting (mixed light/shadow and darkness) if operating in the visible light spectrum.

Thus, it may be desirable to provide a detector that can effectively operate in any environment, while avoiding the weaknesses noted above.

BRIEF SUMMARY OF SOME EXAMPLES

Some example embodiments may enable the provision of a system that is capable of providing improved object detection and classification in all environments.

In one example embodiment, a method of detecting objects of interest may be provided. The method may include receiving, from a sensor, monitoring data associated with the environment, where the monitoring data comprising a series of frames of three-dimensional point cloud information. The method may further include performing, by processing circuitry, image segmentation on the monitoring data to generate segmented three-dimensional data associated with the environment, and identifying, by the processing circuitry, one or more objects in the environment based on subtracting background from the segmented three-dimensional data. The method may further include converting, by the processing circuitry, data associated with the one or more objects from the segmented three-dimensional data into two-dimensional object data, and performing, by the processing circuitry, object classification on the two-dimensional object data.

In another example embodiment, a detector for detecting objects of interest may be provided. The detector may include processing circuitry configured to receive monitoring data associated with an environment being monitored, where the monitoring data includes a series of frames of three-dimensional point cloud information. The processing circuitry may be further configured to perform image segmentation on the monitoring data to generate segmented three-dimensional data associated with the environment, identify one or more objects in the environment based on subtracting background from the segmented three-dimensional data, convert data associated with the one or more objects from the segmented three-dimensional data into two-dimensional object data, and perform object classification on the two-dimensional object data.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 4, which is defined by FIGS. 4A, 4B, 4C, 4D and 4E, shows various image frames corresponding to an environment that was monitored for a period of time in accordance with an example embodiment; and FIG. 5, which is defined by FIGS. 5A, 5B, 5C, 5D, 5E and 5F, shows another series of LIDAR frames being processed in accordance with an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. As used herein, operable coupling should be understood to relate to direct or indirect connection that, in either case, enables functional interconnection of components that are operably coupled to each other. Like reference numerals refer to like elements throughout.

As noted above, detectors that employ thermal imaging or operate in the visible light spectrum are notorious for generating false alarms (where "false alarms" used here includes nuisance alarms—actual physical intrusions but of the wrong type, e.g., people or animals when expecting the opposite—and false alarms—alerts based on the environment and not an actual physical intrusion) and for suffering performance degradation in certain weather or other environmental conditions. Meanwhile, example embodiments herein may perform well in challenging environmental and weather conditions, and may also reduce the number of false alarms or detects. In this regard, in some embodiments, LIDAR (laser imaging detection and ranging) may be used to generate three-dimensional (3D) data associated with an environment being monitored. The 3D data may then be segmented to generate segmented 3D data. Background may then be removed to enable identification of objects of interest in the environment. The segmented 3D data may be converted to two-dimensional (2D) data prior to the performance of object classification. The practice of using 3D data associated with LIDAR enables the detectors to be resilient in challenging weather or other conditions that impact the environment. The segmentation of data in 3D also allows for superior resilience in relation to dynamic objects (such as high speed objects) or issues of scale (due to the location of the object close to or far away from the sensor). Meanwhile, transitioning to 2D thereafter allows for the use of shape classifiers that are otherwise readily available or cheap to produce or employ without suffering any degradation in performance.

Example embodiments may therefore provide superior capabilities for detecting people (even when partially occluded by trees, vehicles or other objects, or when in certain buildings or behind windows or other laser penetrable mediums. The use of LIDAR may also enable the system to be used for covert detection both in full sun, complete darkness, and every condition therebetween. Objects of interest (e.g., people) may be distinguished from objects that are not of interest (e.g., animals or other moving objects in an environment) with a high degree of confidence based on both shape and size criteria. Wind-blown objects (e.g., bushes, brush, foliage or other objects) may be easily rejected, thereby resulting in a superior capability for detecting other objects of interest (which may be defined differently in corresponding different situations). For example, objects of interest could be defined to include weapons, leave-behind improvised explosive devices (IEDs), or the like. Targets or objects of interest may also be distinguished based on velocity, and a high degree of accuracy may be achieved in rain, snow or other weather conditions that may otherwise reduce range capabilities for conventional systems. Accordingly, example embodiments may enable tracking of individual people in crowds, or may enable enhancements being provided to visible and infrared tracking or detection systems.

Figure 1:
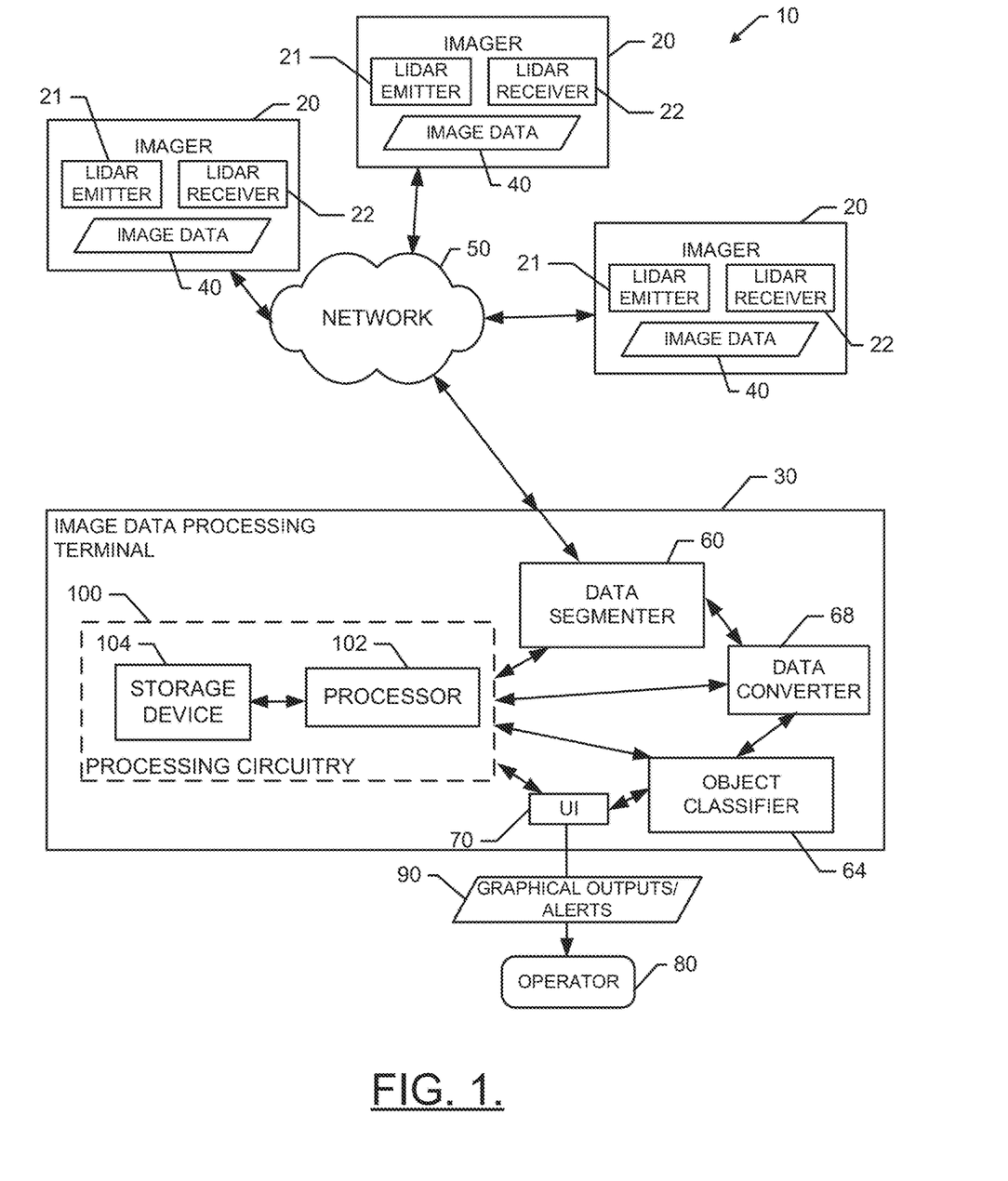
FIG. 1 illustrates a functional block diagram of a system for identifying objects of interest in an environment being monitored according to an example embodiment.

FIG. 1 illustrates a system 10 according to an example embodiment that may include one or more sensors (e.g., imager 20) that are configured to generate 3D data in the form of 3D image data using LIDAR. In this regard, each imager 20 may include a LIDAR sensor that includes a LIDAR emitter 21 and a LIDAR receiver 22. An example of a commercially available imager may be a Sense Photonics LIDAR (e.g., The Sense Photonics Sense One Focus SO-30 or LIDAR equipment that provides 3D point cloud information). However, the imager 20 of some embodiments may be further augmented with other imaging devices or cameras as well (e.g., visible light spectrum cameras and/or thermal imaging cameras). The LIDAR emitter 21 may emit laser light in the 600 to 1000 nm range in some cases. However, other ranges are also possible. For example, the LIDAR emitter 21 may emit laser light in lower wavelength ranges (e.g., 532 nm) or higher ranges (e.g., 1550 nm). Power ranges may also vary, although some examples may employ about 80 W emitters. Example embodiments may have a resolution of at least 128×344 and may therefore enable high confidence detection capabilities at least at ranges of 80 feet.

The LIDAR receiver 22 may be a photodetector or camera configured to detect reflections that return to the LIDAR receiver 22 after transmission from the LIDAR emitter 21. The emissions may be provided in burst form, and the returned signals may be detected at the LIDAR receiver 22 to generate the 3D data in the form of a 3D point cloud of image data 40. The returned signals may be processed as a series of frames of data corresponding to the 3D point cloud information. Thus, the image data 40 of some example embodiments may include a series of frames of 3D point cloud information. The image data 40 may therefore be embodied in some cases as video captured at the LIDAR receiver 22 based on reflections received from the emissions generated by the LIDAR emitter 21. Moreover, given that the image data 40 is typically associated with monitoring of a particular area or environment, the image data 40 may be referred to as monitoring data in some cases.

The example described herein will be related to an asset comprising a programmed computer or analysis terminal that is operably coupled to one or more of the imagers 20 to process the image data 40 received therefrom. The analysis terminal may therefore be referred to as an image data processing terminal 30. However, it should be appreciated that example embodiments may also apply to any asset including, for example, any programmable device that is capable of interacting with image data 40 received in the manner described herein.

Notably, although FIG. 1 illustrates three imagers 20, it should be appreciated that many more imagers 20 may be included in some embodiments and thus, the three imagers 20 of FIG. 1 are simply used to illustrate a potential for a multiplicity of instances of imager 20 and the number of imagers 20 is in no way limiting to other example embodiments. Moreover, example embodiments can also be practiced with fewer imagers 20 and including as little as one imager 20. When multiple imagers 20 are employed, each imager 20 may be associated with a corresponding specific environment or physical location. For example, if four imagers 20 are employed around a building, one imager 20 could be associated with each of the respective four sides of the building. Thus, it can be appreciated that a series of imagers 20 may be utilized to provide comprehensive coverage of a particular area that is to be monitored, by breaking the area up in to a number of manageable sub-areas that may be associated with respective imagers 20.

When multiple imagers 20 are employed, a network 50 may be formed or otherwise may be used to operably couple the multiple imagers 20 to the image data processing terminal 30. The network 50 may be a wireless communication network 50 in some cases. However, in other examples, the network 50 may simply be formed by electronic switches or routers configured to provide the image data 40 (in parallel or in series) to the image data processing terminal 30 using wired connections. Combinations of wired and wireless connections are also possible.

When only one imager 20 is operably coupled to the image data processing terminal 30, no network 50 may be employed at all and, in some cases, the imager 20 and the image data processing terminal 30 may be integrated into a single device or detector. Moreover, it should also be appreciated that a separate instance of the image data processing terminal 30 may be provided for each respective instance of the imager 20. Thus, in some cases, large areas may be monitored with multiple instances of the imager 20 and corresponding multiple instances of the image data processing terminal 30 for each imager 20 or for groups of imagers 20. The output from each of the image data processing terminals 30 (when multiple are used) may also be networked to a common dashboard or status panel at which monitoring may be accomplished.

The image data processing terminal 30 may include or otherwise be embodied as computing device (e.g., a computer, a network access terminal, laptop, server, a personal digital assistant (PDA), mobile phone, smart phone, tablet, or the like) capable of being configured to perform data processing as described herein. As such, for example, the image data processing terminal 30 may include (or otherwise have access to) memory for storing instructions or applications for the performance of various functions and a corresponding processor for executing stored instructions or applications. The image data processing terminal 30 may also include software and/or corresponding hardware for enabling the performance of the respective functions of the image data processing terminal 30 including, for example, the receipt or processing of the image data 40 and the generation and/or sharing of various content items including the outputs of the analyses performed on the image data 40 by the image data processing terminal 30.

The network 50 (if employed) may be a data network, such as a local area network (LAN), a metropolitan area network (MAN), a wide area network (WAN) (e.g., the Internet), and/or the like, which may couple one or more instances of the imager 20 to devices such as processing elements (e.g., personal computers, server computers or the like) and/or databases. Communication between the network 50, the imager(s) 20 and the devices or databases (e.g., servers) to which the imager(s) 20 are coupled may be accomplished by either wireline or wireless communication mechanisms and corresponding communication protocols. The protocols employed may include security, encryption or other protocols that enable the image data 40 to be securely transmitted without sacrificing privacy or operational security.

Figure 3:
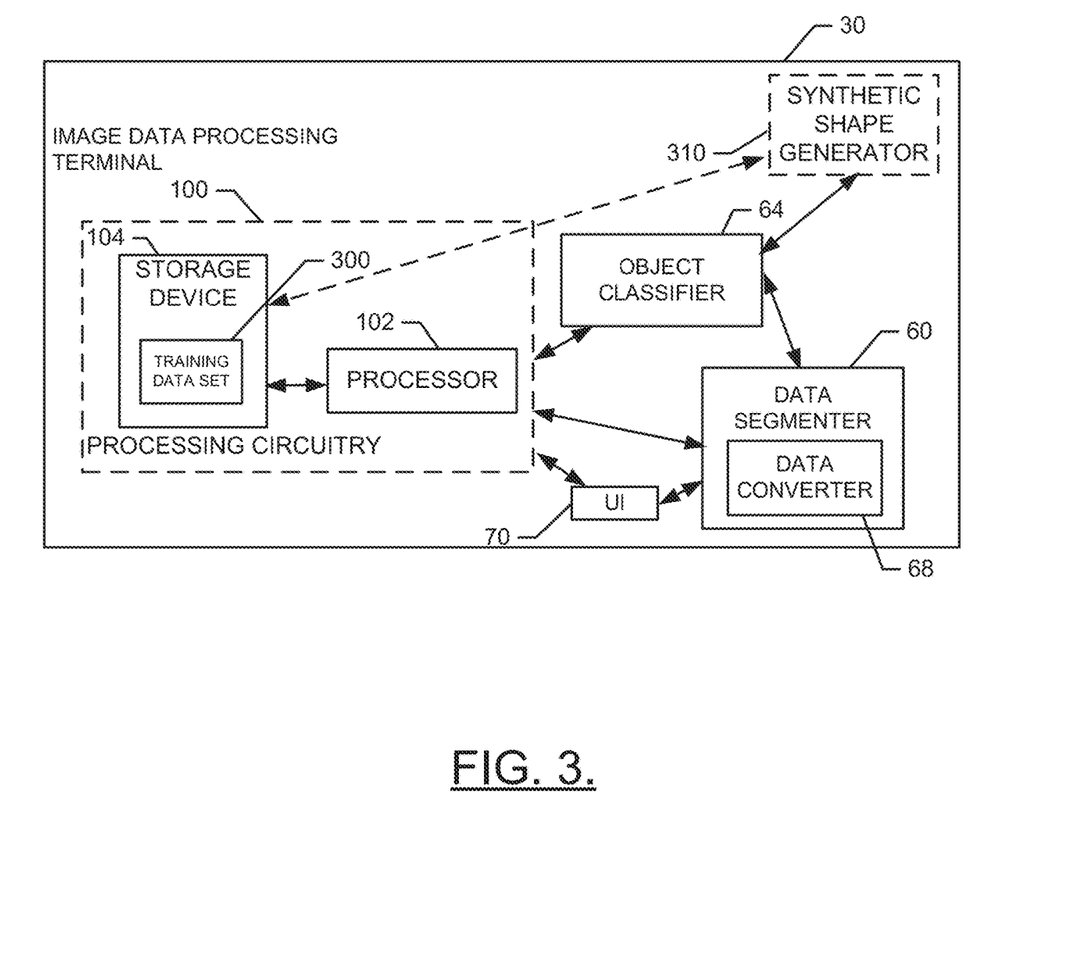
FIG. 3 illustrates an architecture for employing synthetic shape generation to augment a training data set in accordance with an example embodiment.

In an example embodiment, the image data processing terminal 30 may include an image data segmenter (e.g., data segmenter 60) and an object classifier 64. As shown in FIG. 1, the image data processing terminal 30 (or perhaps more specifically the data segmenter 60 (as shown in FIG. 3) or the object classifier 64) may also include a data converter 68 as described in greater detail below. The image data processing terminal 30 may also include a user interface (UI) 70 to enable an operator 80 to interface with the image data processing terminal 30.

The image data processing terminal 30 of FIG. 1 may represent an apparatus for provision of the personnel detection capabilities or other monitoring functions described herein according to an example embodiment. The image data processing terminal 30 may be employed, for example, on a device such as, for example, a computer, a network device, server, proxy, or the like. It should be noted that the devices or elements described below may not be mandatory and thus some may be omitted in certain embodiments.

Referring still to FIG. 1, an apparatus for provision of object isolation and classification based on the image data 40 in accordance with an example embodiment is provided. However, it should be appreciated that the apparatus may also be capable of further providing alerting or warning functions views as well. Thus, the application specifically monitoring for safety or security purposes as described herein should be appreciated as being non-limiting examples. The apparatus may be an embodiment of the image data processing terminal 30. As such, configuration of the apparatus as described herein may transform the apparatus into the image data processing terminal 30. In an example embodiment, the apparatus may include or otherwise be in communication with processing circuitry 100 that is configured to perform data processing, application execution and other processing and management services according to an example embodiment of the present invention. In one embodiment, the processing circuitry 100, which may include a processor 102 and a storage device 104, may be in communication with or otherwise control the user interface 70 and the other components of the image data processing terminal 30 (e.g., the data segmenter 60, the object classifier 64, and/or the data converter 68). As such, the processing circuitry 100 may be embodied as a circuit chip (e.g., an integrated circuit chip) configured (e.g., with hardware, software or a combination of hardware and software) to perform operations described herein. However, in some embodiments, the processing circuitry 100 may be embodied as a portion of a server, computer, laptop, workstation or even one of various mobile computing devices. In situations where the processing circuitry 100 is embodied as a server or at a remotely located computing device, the user interface 70 may be disposed at another device that may be in communication with the processing circuitry 100 via a network (e.g., network 50).

The user interface 70 may be in communication with the processing circuitry 100 to receive an indication of a user input at the user interface 70 and/or to provide an audible, visual, mechanical or other output to the user (e.g., graphical outputs/alerts 90). As such, the user interface 70 may include, for example, a keyboard, a mouse, a joystick, a display, a touch screen, a microphone, a speaker, a cell phone, or other input/output mechanisms. In embodiments where the apparatus is embodied at a server or other network entity, the user interface 70 may be limited or even eliminated in some cases. Alternatively, as indicated above, the user interface 70 may be remotely located. In some cases, the user interface 70 may also include a series of web pages or interface consoles generated to guide the user through various options, commands, flow paths and/or the like for control of or interaction with the image data processing terminal 30. The user interface 70 may also include interface consoles or message generation capabilities to send instructions, warnings, alerts, etc., and/or to provide an output that clearly indicates a correlation between objects in the image data 40 and specific types of objects of interest or targets (e.g., people, specific individuals, specific objects, etc.).

In an example embodiment, the storage device 104 may include one or more non-transitory storage or memory devices such as, for example, volatile and/or non-volatile memory that may be either fixed or removable. The storage device 104 may be configured to store information, data, applications, instructions or the like for enabling the apparatus to carry out various functions in accordance with example embodiments of the present invention. For example, the storage device 104 could be configured to buffer input data for processing by the processor 102. Additionally or alternatively, the storage device 104 could be configured to store instructions for execution by the processor 102. As yet another option, the storage device 104 may include one of a plurality of databases that may store a variety of files, contents or data sets, or structures used to embody one or more neural networks capable of performing machine learning as described herein. Among the contents of the storage device 104, applications may be stored for execution by the processor 102 in order to carry out the functionality associated with each respective application.

The processor 102 may be embodied in a number of different ways. For example, the processor 102 may be embodied as various processing means such as a microprocessor or other processing element, a coprocessor, a controller or various other computing or processing devices including integrated circuits such as, for example, an ASIC (application specific integrated circuit), an FPGA (field programmable gate array), a hardware accelerator, or the like. In an example embodiment, the processor 102 may be configured to execute instructions stored in the storage device 104 or otherwise accessible to the processor 102. As such, whether configured by hardware or software methods, or by a combination thereof, the processor 102 may represent an entity (e.g., physically embodied in circuitry) capable of performing operations according to embodiments of the present invention while configured accordingly. Thus, for example, when the processor 102 is embodied as an ASIC, FPGA or the like, the processor 102 may be specifically configured hardware for conducting the operations described herein. Alternatively, as another example, when the processor 102 is embodied as an executor of software instructions, the instructions may specifically configure the processor 102 to perform the operations described herein.

In an example embodiment, the processor 102 (or the processing circuitry 100) may be embodied as, include or otherwise control the data segmenter 60, the object classifier 64, and/or the data converter 68, each of which may be any means such as a device or circuitry operating in accordance with software or otherwise embodied in hardware or a combination of hardware and software (e.g., processor 102 operating under software control, the processor 102 embodied as an ASIC or FPGA specifically configured to perform the operations described herein, or a combination thereof) thereby configuring the device or circuitry to perform the corresponding functions of the data segmenter 60, the object classifier 64, and/or the data converter 68, respectively, as described herein.

The data segmenter 60 may be configured to receive the image data 40 and perform image segmentation thereon. As the image data 40 is 3D point cloud information in this example, it can be appreciated that the segmented data that results from the data segmenter 60 is also a series of image frames of segmented 3D data. In other words, the segmentation of the data segmenter 60 is performed in a 3D context. Meanwhile, the segmentation process itself may employ connected component analysis methods to classify individual sections of the image frames as discrete blobs that appear to be similar to each other (and therefore may likely correlate to the same object). In some examples, the connected component analysis may be based off of the Disjoint Set data structure as described in Galler et al., "An improved equivalence algorithm," Communications of the ACM, 7 (5): 301-303 (May 1964), and Galil et al., "Data structures and algorithms for disjoint set union problems," ACM Computing Surveys, 23 (3): 319-344 (1991), which are incorporated herein in their entirety by reference. Thus, for example, graph edges may be defined for points that are adjacent to each other in a 2D structured point cloud provided by the imager 20, and that are also within a minimum distance threshold of each other in 3D space.

Given that the image data 40 (and the segmented 3D data) are represented by a series of frames, the frames can be compared to each other to subtract background information and identify potential objects of interest (e.g., targets) within the image data 40. In an example embodiment, the object classifier 64 (or the data segmenter 60) may be configured to subtract one frame from an adjacent frame (or series of frames) in order to remove background objects, and leave potential objects for classification. In this regard, for example, the object classifier 64 (or data segmenter 60) may be configured to compare frames of the segmented 3D data to subtract data associated with unchanged segments over a time averaged period and retain data associated with changed segments over the time averaged period. The removal of background information therefore also happens in a 3D context. However, the object classifier 64 then uses the data converter 68 (which may be internal or external to the object classifier 64, and is sometimes internal to the image segmenter 60) to convert the segmented 3D data that remains after background removal into 2D data. To do so, the data converter 68 may be designed to effectively trace a boundary of the potential objects (identified in 3D) in two dimensions. What remains after the conversion is a two-dimensional potential object or object candidate that can be evaluated based on training data previously used to teach the object classifier 64 to classify objects. Accordingly, for example, the data converter 68 may be configured to begin with an initial assumption that the system will be stationary. Accordingly, any movement detected should be due to objects of interest moving in the scene rather than due to changing viewpoint of the imager 20. The system may be calibrated before use by capturing a sequence of 3D image data that does not contain any objects of interest (e.g., no people or animals). The data sequence captured without objects may then be used to build a statistical background model of the scene. For each pixel in a structured point cloud representing a single LIDAR ray, a probability distribution function may be built representing the likelihood that a measured depth at that pixel represents the background. To account for minor background movements (e.g., vegetation blowing in the wind), the probability functions of neighboring pixels may also be averaged using a Gaussian weight function. After calibration, the depth measurement for each pixel may be compared against its corresponding probability distribution, and if the background likelihood is below a configurable threshold, the corresponding pixel may be labeled as foreground.

In an example embodiment, the object classifier 64 may include a neural network that is trained to recognize specific shapes based on a training data set. An example implementation of the object classifier 64 may be a MobileNet V2 shape classifier (Sandler et al., "MobileNetV2: Inverted Residuals and Linear Bottlenecks," The IEEE Conference on Computer Vision and Pattern Recognition (CVPR), 2018, pp. 4510-4520, is incorporated herein in its entirety by reference). The training data set may be used to effectively make the object classifier 64 aware of specific patterns that may be encountered for various objects (or portions of the objects) in various different positions and orientations. Thus, for example, the object classifier 64 may be trained to recognize a human form (or an animal form, or specific animal forms, or other specific object forms) in various possible poses or orientations. Given that humans have a distinctly characteristic set of features when viewed in two dimensions from various different perspectives, the neural network of the object classifier 64 can be trained (using a large training data set comprised of samples covering many poses and positions of humans) to identify objects that are likely correlated to humans. When the data converter 68 is employed in the data segmenter 60, the data segmenter 60 may be configured to employ an efficient nearest neighbor segmentation on each frame in order to create a motion-filter effect by projecting the 3D LIDAR point cloud information to a 2D shape (projected orthogonal to the rays of the LIDAR emitter 21).

In some cases, it may also be possible (particularly if resolution available is sufficiently high) to further classify humans (i.e., filter groups by body size or recognize known individuals by facial features), or specific objects (e.g., weapons, IEDs, etc.). However, in some cases, the imager 20 may further include visible light cameras and/or thermal imaging cameras to enable high resolution camera images to be taken in parallel with the processing described herein. In such cases, the high resolution camera images may be used for specific identification of individuals or smaller objects.

Figure 2:
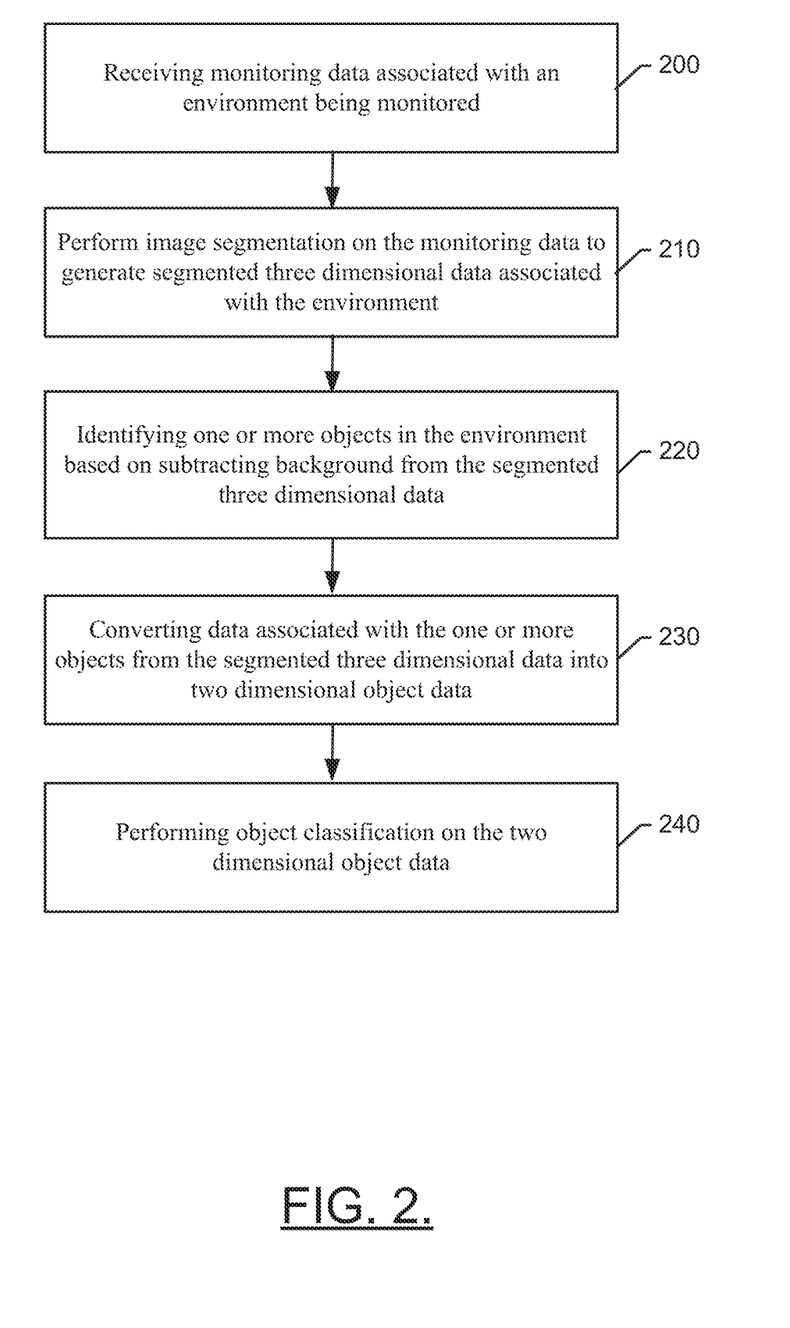
FIG. 2 illustrates a block diagram of a method of identifying objects of interest in the environment being monitored according to an example embodiment.

FIG. 2 illustrates a block diagram showing a high-level functioning of the image data processing terminal 30 of an example embodiment. In this regard, the image data processing terminal 30 may be configured (e.g., via configuration of the processing circuitry 100 thereof) to receive monitoring data associated with an environment being monitored at operation 200. As noted above, the monitoring data (e.g., image data 40) includes a series of frames of 3D point cloud information. The image data processing terminal 30 may also be configured to perform image segmentation on the monitoring data to generate segmented three-dimensional data associated with the environment at operation 210. The image data processing terminal 30 may then be configured to identify one or more objects in the environment based on subtracting background from the segmented three-dimensional data at operation 220. The image data processing terminal 30 may then convert data associated with the one or more objects from the segmented three-dimensional data into two-dimensional object data at operation 230 and perform object classification on the two-dimensional object data at operation 240.

As can be appreciated from the description above, the image data processing terminal 30 is configured to perform image segmentation and background removal in a 3D context, and then shift to a 2D context prior to performing object classification. Although processing that involves a shift in contexts (e.g., from 3D to 2D) might normally be considered inferior to simply completing all processing in a single context, the context shift that is performed by example embodiments enables the use of a relatively cheap or even conventional 2D object classifier at the last step of the method. However, employing the power of performing image segmentation and background removal in order to identify object candidates in a 3D context prior to engaging in object classification causes significant advantages to be achievable in relation to avoidance of false detections. For example, responses to changes in object size (due to varying distances from the LIDAR sensor) and changes to object speed are very well handled by the image data processing terminal 30 since the segmentation and identification of object candidates is all conducted in the 3D context.

Accordingly, in some examples, the image data processing terminal 30 may be configured to employ additional levels of analysis for rejection of object candidates (that are not objects of interest or targets) without being confused by specific factors such as size, shape and velocity. In this regard, for example, an animal or person that is closer to the imager 20 obviously provides a larger object candidate than one that is far distant from the imager 20. Many classifiers employ size filters that reject objects that are either too large (and therefore potentially too close) or too small (and therefore potentially too far away). However, the image data processing terminal 30 may avoid employing any size filters and still provide excellent resolution over areas that can have depth as well as vertical and horizontal dimensions of coverage. In this regard, as image segmentation and removal of background (leaving candidate objects for analysis) occurs in a 3D context, and object classification occurs in a 2D context based on the shape of the object in two dimensions at a first level of analysis, the additional rejection of candidate objects based on either size or velocity merely adds additional levels of analysis that are relatively simple to conduct within the 2D context, whereas the isolation of the objects for analysis may occur in the 3D context. The isolation of objects in a 3D context may incorporate size selection opportunities by virtue of the fact that a selection size for clusters of points in the 3D data may be selected based on statistical analysis of expected size and volumes for targets. Rejection of objects may then be accomplished based on expected aspect ratios for targets of interest. However, size rejection can also be performed in the 2D context. In this regard, projection of candidate objects into 2D space tends to scale the object but otherwise preserve information associated with physical size. Thus, for example, resulting 2D object candidates may only differ in terms of size based on distance from the camera, but scaling may account for the difference in an otherwise similar (or identical) shape. After projection into 2D space, the pixels of resulting 2D images are associated with the physical extents of the object and can be rejected if the corresponding physical extents are larger than estimates for statistically probable physical extents of objects. Statistically probable speed data for targets may also be used to enable similar speed based selection or rejection of targets. In this regard, for example, if an object moves faster than the statistically probable speeds expected for a given target, then the object may be rejected. Thus, if the object classifier 64 is trained to identify humans, the ability to accurately detect an animal close to or far from the imager 20, or that is moving through the environment, may not be hampered since the resultant 2D shapes that are identified as not being background from different frames can be recognized during classification as being similar (except issues of scale or speed) to animal shapes. The corresponding animal shapes can then be rejected accurately, whereas if the shape was human (or another object of interest), the shape could be classified as an object of interest without limitation based on size (or scale). Thus, it can be appreciated that the first level of analysis associated with rejection of candidate objects that are not of interest (or selection of candidate objects or targets that are of interest) may be accomplished based on checks that are associated with the shape of 2D objects. However, additional second and third levels of analysis can be provided for checking object correlation to objects of interest regardless of size or velocity.

As can be appreciated from the description above, an aspect that may impact the performance capabilities of the object classifier 64 may be the quality and/or quantity of the training data set used to train the neural network. To provide a more robust training data set 300, some example embodiments may employ a synthetic shape generator 310 as shown in the example of the image data processing terminal 30 shown in FIG. 3. The synthetic shape generator 310 may, for example, be a gaming engine or other graphics or image generator that can provide different programmable shapes (e.g., corresponding to animals, humans, objects, etc.) to generate a plurality of shapes for training corresponding to different poses, perspectives, ranges, levels of occlusion, and/or the like of the various objects that are to be identified by the image data processing terminal 30 to generate the graphics output/alerts 90 shown in FIG. 1. Thus, the synthetic shape generator 310 can be used to specifically target improvement of classification capabilities relating to specific objects and/or situations of interest. For example, if identifying humans with varying levels of occlusion is desirable, the synthetic shape generator 310 may be used to generate training data that corresponds to human shapes in multiple poses, at multiple ranges, and with varying different parts of the human shape being removed due to being occluded by an object. The object classifier 64 may then have substantial training on classifying shapes with as human, even in heavily occluded scenarios. FIG. 4 illustrates one such example.

Figure 4A:
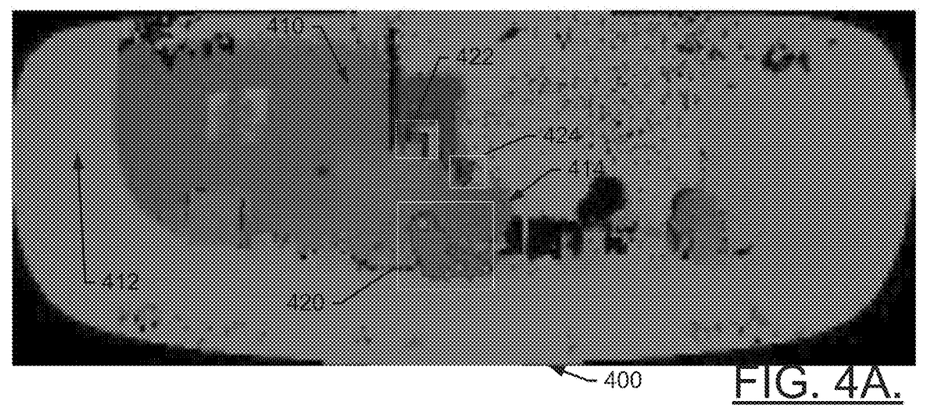

FIG. 4, which is defined by FIGS. 4A, 4B, 4C, 4D and 4E, shows various image frames (some of which are visible light image frames, and others of which are LIDAR frames) corresponding to an environment that was monitored for a period of time. In this regard, FIG. 4A illustrates a first LIDAR frame 400 associated the environment. As can be seen in FIG. 4A, a building 410 or house is part of the background along with various other plants including a tree 412 and a bush 414. As discussed above, the first LIDAR frame 400 may be segmented and nearest neighbor analysis may be used to facilitate removal of background and identification of candidate objects. By comparing the first LIDAR frame 400 to other frames adjacent thereto, portions of the building 410, the tree 412, and other background objects may have been previously determined to be background by subtraction. Meanwhile, when objects move into the environment (or move within the environment), such objects can be appreciated as not being background.

Figure 4B:
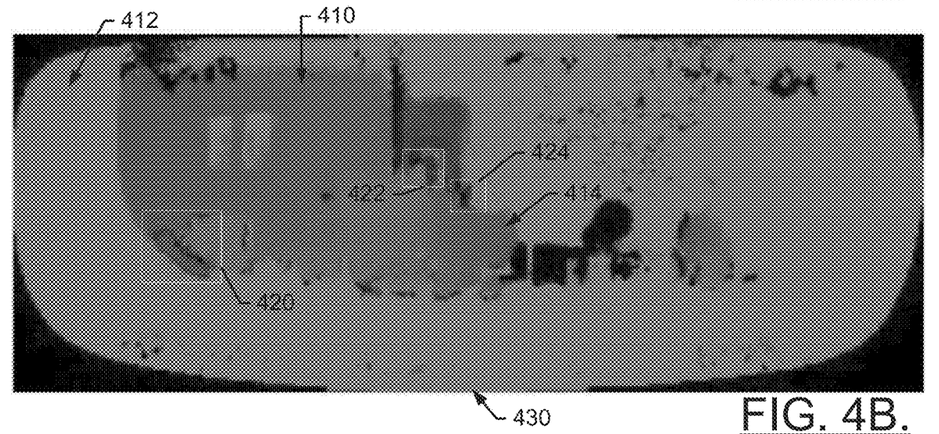
Figure 4C:
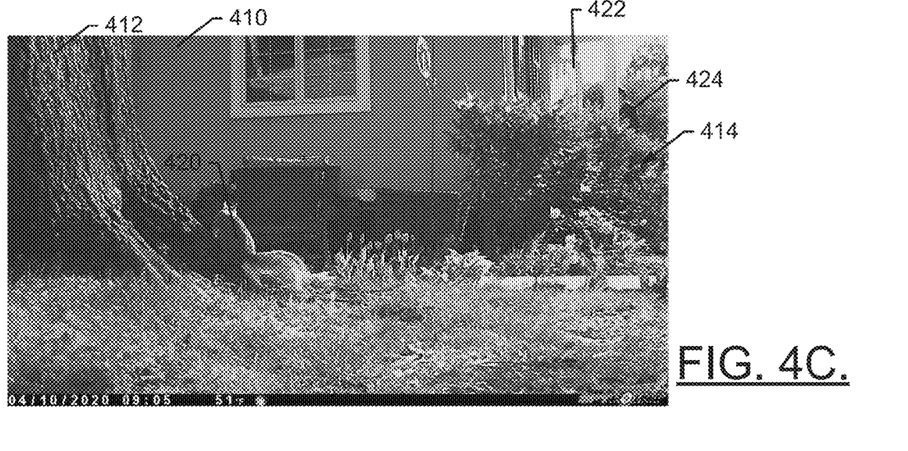

In FIG. 4A, a first object 420 is highlighted by a box, along with a second object 422 and a third object 424. Meanwhile, second LIDAR frame 430, which is shown in FIG. 4B, shows movement of the first object 420 to a position at the base of the tree 412. FIG. 4C shows a visible light image of a portion of the environment at the time corresponding to the second LIDAR frame 430 of FIG. 4B. As can be appreciated by comparing FIGS. 4B and 4C, the first object 420 is a squirrel, the second object 422 is an opened door (or portion thereof), and the third object 424 is a person that is partially occluded by a column of the building 410 and by the bush 414. The object classifier 64 of FIGS. 1 and 3 may be trained to determine that the first object 420 is an animal (and therefore not a human) and that the second object 422 is also not human. The object classifier 64 could also be trained to positively identify the first object 420 as a squirrel if trained appropriately (e.g., if squirrel or specific animal identification was desired). However, as an alternative, the object classifier 64 may simply not identify the first or second objects 420 or 422 as humans if the object classifier 64 is only trained to identify humans (or other objects of interest) positively. Thus, no alerts or messages may be generated based on the first or second objects 420 or 422.

The third object 424, even though partially occluded, may still be identified as a human based on the shape of the object, and the capability of the object classifier 64 to convert the 3D image data to 2D data prior to performing object classification. In some cases, the user interface 70 may provide an alert (e.g., the graphical outputs/alerts 90 of FIG. 1) to indicate the presence of the third object 424 when the human classification is completed.

Figure 4D:
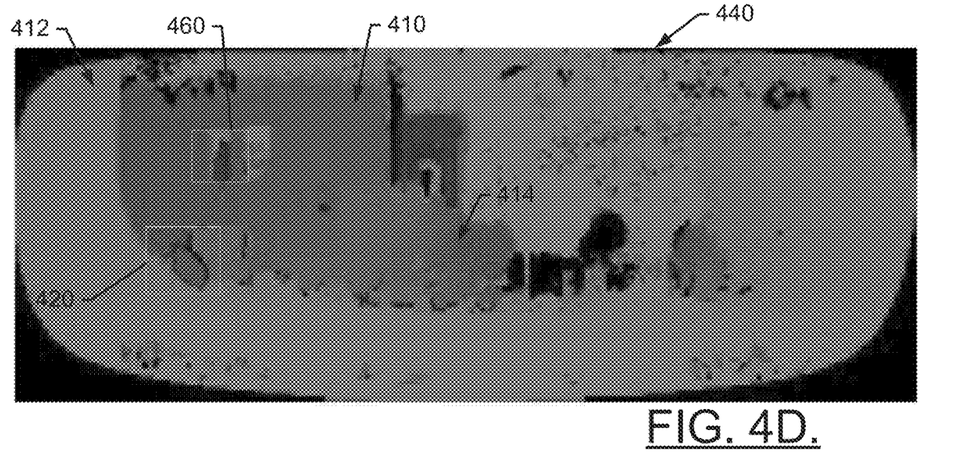
Figure 4E:
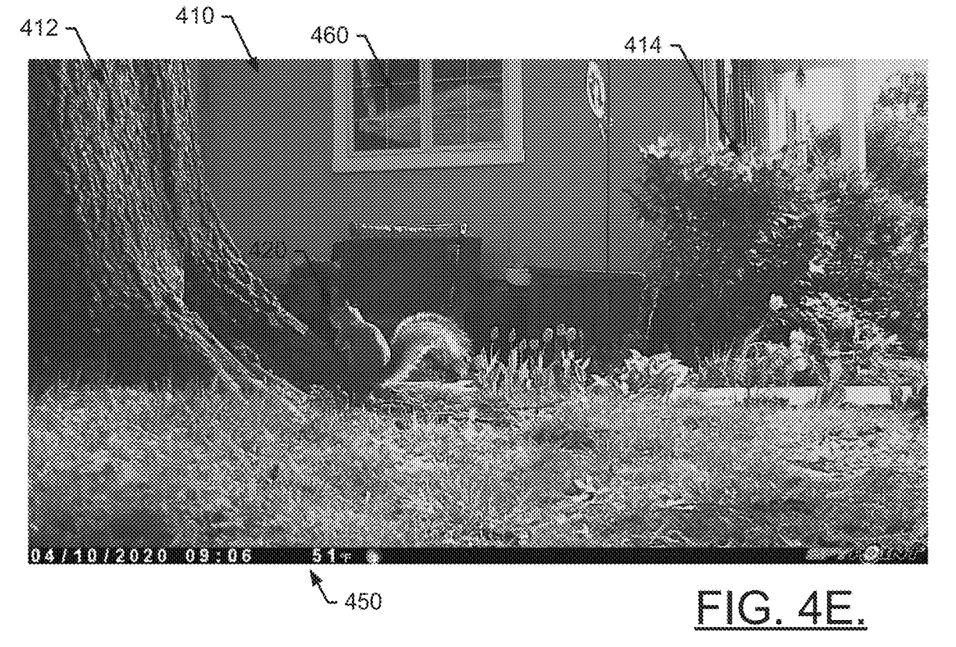

FIG. 4D illustrates a third LIDAR frame 440 corresponding to a later time, and FIG. 4E illustrates a corresponding visible light image 450. As can be appreciated from comparing all of the scenes of FIG. 4, the second object 422 and the third object 424 are no longer present, but the first object 420 remains by the base of the tree 412. However, because the frequencies of the LIDAR sensor are capable of penetrating the window of the building 410, a fourth object 460 is visible through the window. The fourth object 460, even though partially occluded and behind the window, may also be capable of being detected as a candidate object (e.g., in 3D), and then further being classified after conversion to 2D as being a human object.

Figure 5A:
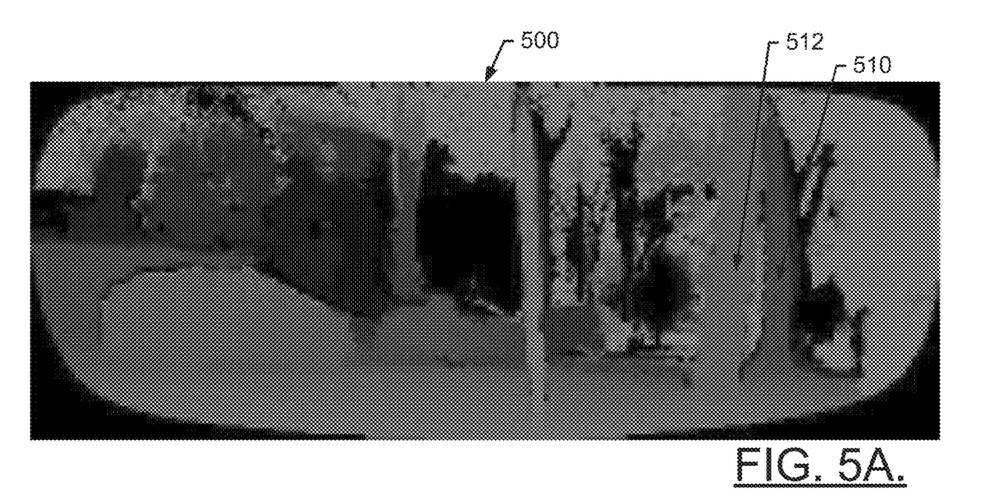
Figure 5B:
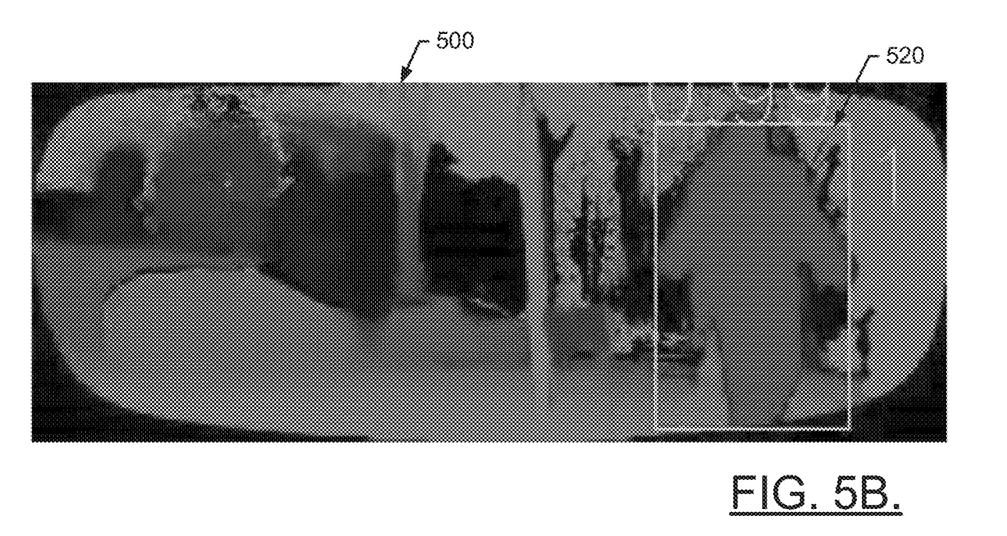

FIG. 5, which is defined by FIGS. 5A, 5B, 5C, 5D, 5E and 5F, shows another series of LIDAR frames being processed in accordance with an example embodiment. In this regard, FIG. 5A illustrates an environment 500 that is largely wooded (including a first tree 510 and a second tree 512). As noted above, any objects (including the first and second trees 510 and 512, and any other vegetation in the environment) may be considered background after segmentation and processing associated with operations 200, 210 and 220 above. In FIG. 5B, an object 520 has entered into the environment 500 in the foreground. Moreover, the object 520 may be classified as a human object or target object using operations 230 and 240 above.

Figure 5C:
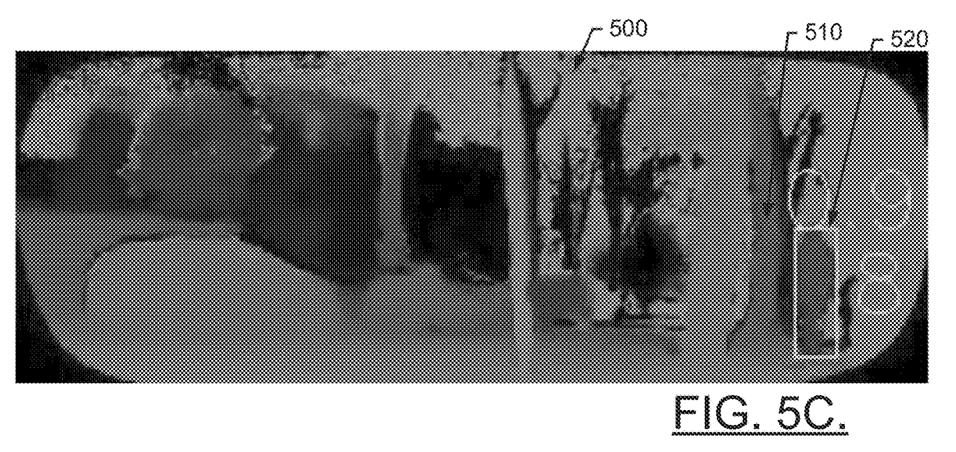
Figure 5D:
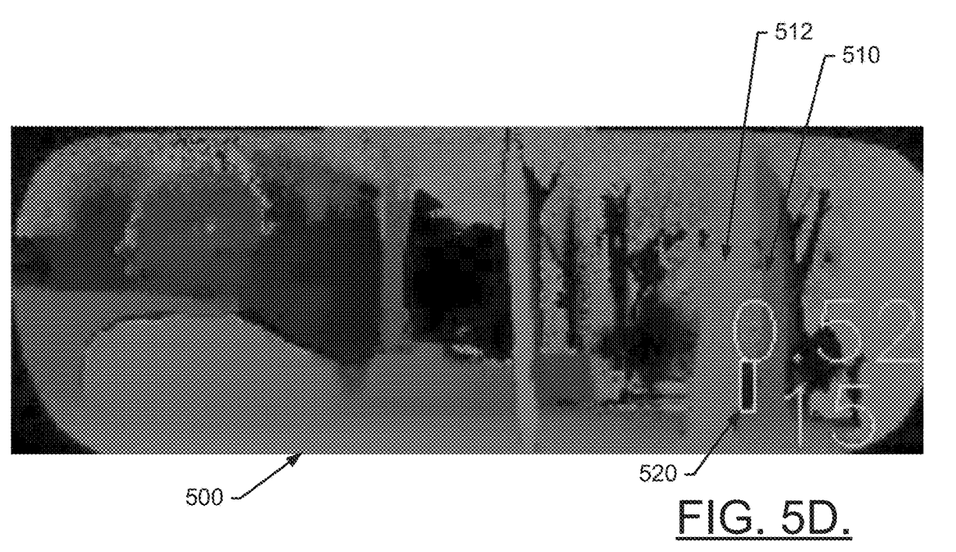
Figure 5E:
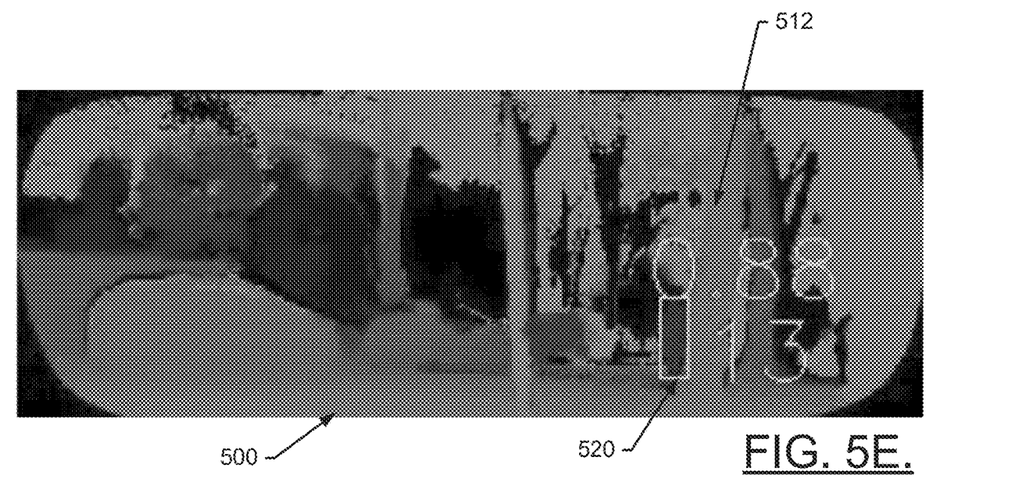
Figure 5F:
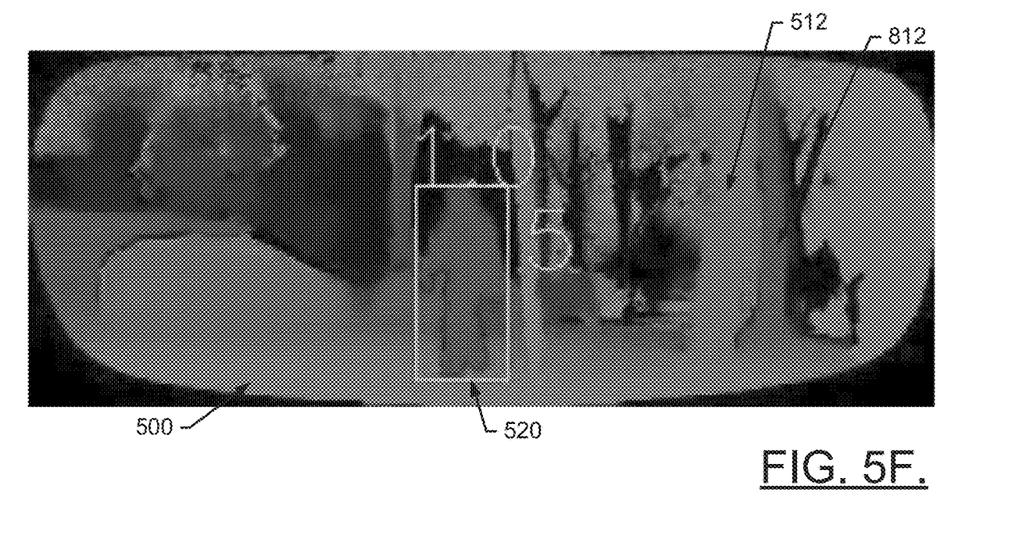

The object 520 may continue to move through the environment 500 and be tracked as shown in FIGS. 5C to 5E. In this regard, in FIG. 5C, the object 520 has moved from the foreground to toward the background. The scale (or size) of the object 520 can be seen to have reduced significantly from the view shown in FIG. 5B due to the movement toward the background. In FIG. 5D, the object 520 has moved behind the first tree 510 and to the left, and is therefore partially occluded by both the first tree 510 and second tree 512. Nevertheless, the object classifier 64 may be enabled to recognize the object 520 and classify the object properly both in spite of the occlusion and the range. In FIG. 5E, the object 520 is emerging to the left of the second tree 512 (and therefore transitioning from being partially occluded to not being occluded) while now moving from the background toward the foreground. Finally, in FIG. 5F, the object 520 is moving back toward the foreground to close range with the imager 20 and therefore increase size of the object 520.

Example embodiments may therefore be used effectively to remove time-averaged background from a scene and leave change-based or motion-based object candidates or potential targets of interest based on the segmentation in 3D space. Thus, intensity of objects or portions thereof, color, and other factors are not used by the object classifier 64 and not important to the analysis described herein. The capability of the image data processing terminal 30 to receive and process image segmentation to identify background (thereby leaving candidate objects for analysis) in a 3D context, and then conduct object classification in a 2D context makes the image data processing terminal 30 exceptionally resilient to things like weather, range and other environmental factors. In effect, the segmentation in the 3D context enables performance of an efficient nearest neighbors segmentation that acts as a motion filter by projecting the 3D point cloud data of the image data 40 to a 2D shape (e.g., a non-orthogonal projection).

As a result, a system capable of automatic calibration to the environment, which does not require user configuration, and yet provides effective people identification and tracking (even in crowds or other challenging environments) is possible with a significant reduction in false alarms or false positive detections. The automatic calibration to a new environment means the imager 20 can be moved or adjusted and rapidly re-determine what is background and what is not. Furthermore, once an object of interest or target has been identified, the corresponding object can be tracked or monitored, or be used to initiate notifications or alarms. Thus, for example, an object (e.g., an IED) that is carried into the environment, and left alone and unattended, may still be identified and classified as a threat. An alarm or other notification to an appropriate authority or agency may then be issued.

From a technical perspective, the image data processing terminal 30 described above may be used to support some or all of the operations described above. As such, the platform described in FIG. 1 may be used to facilitate the implementation of several computer program and/or network communication based interactions. As an example, FIG. 2 is an example of a flowchart of a method and program product according to an example embodiment of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a user terminal and executed by a processor in the user terminal. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In an example embodiment, an apparatus for performing the method of FIG. 2 above may comprise a processor (e.g., the processor 102) or processing circuitry configured to perform some or each of the operations (200-240) described above. The processor may, for example, be configured to perform the operations (200-240) by performing hardware implemented logical functions, executing stored instructions, or executing algorithms for performing each of the operations. In some embodiments, the processor or processing circuitry may be further configured to perform the additional operations or optional modifications to operations 200-240 that are discussed above.

The method may include receiving, from a sensor, monitoring data associated with the environment, where the monitoring data comprising a series of frames of three-dimensional point cloud information. The method may further include performing, by processing circuitry, image segmentation on the monitoring data to generate segmented three-dimensional data associated with the environment, and identifying, by the processing circuitry, one or more objects in the environment based on subtracting background from the segmented three-dimensional data. The method may further include converting, by the processing circuitry, data associated with the one or more objects from the segmented three-dimensional data into two-dimensional object data, and performing, by the processing circuitry, object classification on the two-dimensional object data. By performing the method described above, example embodiments may be enabled to perform real-time processing in an embedded computing environment (or other more complicated environments) to achieve quality detection that is accurate and therefore avoids false alarms. Example embodiments may also provide a monitoring platform that is low in weight and size, while also having relatively low power requirements.

In some embodiments, the features or operations described above may be augmented or modified, or additional features or operations may be added. These augmentations, modifications and additions may be optional and may be provided in any combination. Thus, although some example modifications, augmentations and additions are listed below, it should be appreciated that any of the modifications, augmentations and additions could be implemented individually or in combination with one or more, or even all of the other modifications, augmentations and additions that are listed. As such, for example, the monitoring data may be received from a LIDAR sensor, and the three-dimensional point cloud information is generated via LIDAR from the LIDAR sensor. In an example embodiment, identifying the one or more objects may include comparing frames of the segmented three-dimensional data to subtract data associated with unchanged segments over a time averaged period and retain data associated with changed segments over the time averaged period. In some examples, converting data associated with the one or more objects from the segmented three-dimensional data into the two-dimensional object data may include forming (e.g., by tracing the outline (flattening the depth data along the viewing direction to 2D)) a two-dimensional shape around the one or more objects from the segmented three-dimensional data to define the two-dimensional object data. In an example embodiment, the processing circuitry may be further configured to classify the two-dimensional object data based on a size of the two-dimensional shape. In some examples, the processing circuitry may be further configured to classify the two-dimensional object data based on a velocity of the two-dimensional shape. In an example embodiment, performing image segmentation may include performing nearest neighbor segmentation on each of the frames to identify candidate objects. In some cases, performing object classification comprises employing a neural network trained on a training data set to enable the candidate objects to be classified based on similarity (within the weights and measures of the neural network) to the training data set. In an example embodiment, the processing circuitry may be operably coupled to a synthetic shape generator configured to generate synthetic images of objects to at least partially define the training data set. In some cases, the training data set may include different perspective views of objects of interest and different levels of occlusion of the objects of interest.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A detector comprising processing circuitry configured to:
    receive monitoring data associated with an environment being monitored, the monitoring data comprising a series of frames of three-dimensional point cloud information,
    perform image segmentation on the monitoring data to generate segmented three-dimensional data associated with the environment responsive to receiving the monitoring data;
    identify one or more objects in the environment based on subtracting background from the segmented three-dimensional data after generating the segmented three-dimensional data;
    convert data associated with the one or more objects from the segmented three-dimensional data into two-dimensional object data after the identification of one or more objects in the environment; and
    subsequently, perform object classification on the two-dimensional object data.

2. The detector of claim 1, wherein the monitoring data is received from a LIDAR sensor, and
    wherein the three-dimensional point cloud information is generated via LIDAR from the LIDAR sensor.

3. A detector comprising processing circuitry configured to:
    receive monitoring data associated with an environment being monitored, the monitoring data comprising a series of frames of three-dimensional point cloud information,
    perform image segmentation on the monitoring data to generate segmented three-dimensional data associated with the environment;
    identify one or more objects in the environment based on subtracting background from the segmented three-dimensional data;
    convert data associated with the one or more objects from the segmented three-dimensional data into two-dimensional object data; and
    perform object classification on the two-dimensional object data,
    wherein identifying the one or more objects comprises comparing frames of the segmented three-dimensional data to subtract data associated with unchanged segments over a time averaged period and retain data associated with changed segments over the time averaged period.

4. The detector of claim 1, wherein converting data associated with the one or more objects from the segmented three-dimensional data into the two-dimensional object data comprises forming two-dimensional shapes from the one or more objects from the segmented three-dimensional data to define the two-dimensional object data.

5. The detector of claim 4, wherein the processing circuitry is further configured to classify the two-dimensional object data based on a size of the two-dimensional shape.

6. The detector of claim 4, wherein the processing circuitry is further configured to classify the two-dimensional object data based on a velocity of the two-dimensional shape.

7. The detector of claim 1, wherein performing image segmentation comprises performing nearest neighbor segmentation on each of the frames to identify candidate objects.

8. The detector of claim 7, wherein performing object classification comprises employing a neural network trained on a training data set to enable the candidate objects to be classified based on similarity to images in the training data set.

9. The detector of claim 8, wherein the processing circuitry is operably coupled to a synthetic shape generator configured to generate synthetic images of objects to at least partially define the training data set.

10. The detector of claim 9, wherein the training data set includes different perspective views of objects of interest and different levels of occlusion of the objects of interest.

11. A method of detecting objects in an environment being monitored, the method comprising:
    receiving, from a sensor, monitoring data associated with the environment, the monitoring data comprising a series of frames of three-dimensional point cloud information,
    performing, by processing circuitry, image segmentation on the monitoring data to generate segmented three-dimensional data associated with the environment responsive to receiving the monitoring data;

identifying, by the processing circuitry, one or more objects in the environment based on subtracting background from the segmented three-dimensional data after generating the segmented three-dimensional data;

converting, by the processing circuitry, data associated with the one or more objects from the segmented three-dimensional data into two-dimensional object data after the identification of one or more objects in the environment; and subsequently performing, by the processing circuitry, object classification on the two-dimensional object data.

12. The method of claim 11, wherein the sensor is a LIDAR sensor, and
wherein the three-dimensional point cloud information is generated via LIDAR from the LIDAR sensor.

13. The method of claim 11, wherein identifying the one or more objects comprises comparing frames of the segmented three-dimensional data to subtract data associated with unchanged segments over a time averaged period and retain data associated with changed segments over the time averaged period.

14. The method of claim 11, wherein converting data associated with the one or more objects from the segmented three-dimensional data into the two-dimensional object data comprises forming two-dimensional shapes from the one or more objects from the segmented three-dimensional data to define the two-dimensional object data.

15. The method of claim 14, wherein the processing circuitry is further configured to classify the two-dimensional object data based on a size of the two-dimensional shape.

16. The method of claim 14, wherein the processing circuitry is further configured to classify the two-dimensional object data based on a velocity of the two-dimensional shape.

17. The method of claim 11, wherein performing image segmentation comprises performing nearest neighbor segmentation on each of the frames to identify candidate objects.

18. The method of claim 17, wherein performing object classification comprises employing a neural network trained on a training data set to enable the candidate objects to be classified based on similarity to images in the training data set.

19. The method of claim 18, wherein the processing circuitry is operably coupled to a synthetic shape generator configured to generate synthetic images of objects to at least partially define the training data set.

20. The method of claim 19, wherein the training data set includes different perspective views of objects of interest and different levels of occlusion of the objects of interest.

* * * * *